(12) United States Patent
Jenkins et al.

(10) Patent No.: US 9,419,899 B2
(45) Date of Patent: Aug. 16, 2016

(54) AUTOMATED SERVICE INTERFACE OPTIMIZATION

(71) Applicant: Amazon Technologies, Inc., Seattle, WA (US)

(72) Inventors: Jonathan A. Jenkins, Seattle, WA (US); Timothy M. Sehn, Seattle, WA (US); Brian Evan Maher, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/713,294

(22) Filed: May 15, 2015

(65) Prior Publication Data

US 2015/0249607 A1 Sep. 3, 2015

Related U.S. Application Data

(63) Continuation of application No. 14/479,759, filed on Sep. 8, 2014, now Pat. No. 9,038,094, which is a continuation of application No. 13/959,340, filed on Aug. 5, 2013, now Pat. No. 8,832,714, which is a continuation of application No. 12/640,321, filed on Dec. 17, 2009, now Pat. No. 8,505,034.

(51) Int. Cl.
| | | |
|---|---|---|
| *G06F 13/00* | (2006.01) | |
| *H04L 12/801* | (2013.01) | |
| *G06F 9/54* | (2006.01) | |
| *G06F 17/30* | (2006.01) | |
| *H04L 12/26* | (2006.01) | |
| *H04L 29/06* | (2006.01) | |

(52) U.S. Cl.
CPC *H04L 47/10* (2013.01); *G06F 9/54* (2013.01); *G06F 17/30144* (2013.01); *H04L 43/08* (2013.01); *H04L 67/42* (2013.01); *G06F 2209/541* (2013.01)

(58) Field of Classification Search
CPC .................................. G06F 9/465; G06F 9/541
USPC .................................................... 719/316, 328
See application file for complete search history.

(56) References Cited

U.S. PATENT DOCUMENTS

| | | |
|---|---|---|
| 6,463,582 B1 | 10/2002 | Lethin et al. |
| 6,842,892 B1 | 1/2005 | Goldberg et al. |
| 7,058,655 B2 | 6/2006 | Goldberg et al. |
| 7,900,214 B2 | 3/2011 | Goring et al. |
| 7,945,596 B2 | 5/2011 | Anonsen et al. |
| 8,135,690 B2 | 3/2012 | Eidt et al. |
| 8,195,743 B2 | 6/2012 | Janedittakarn et al. |
| 8,326,814 B2 | 12/2012 | Ghods et al. |
| 8,341,646 B2 | 12/2012 | Bornhoevd et al. |
| 8,505,034 B2 | 8/2013 | Jenkins et al. |
| 8,832,714 B1 | 9/2014 | Jenkins et al. |

(Continued)

*Primary Examiner* — Andy Ho
(74) *Attorney, Agent, or Firm* — Thomas | Horstemeyer, LLP

(57) ABSTRACT

Disclosed are various embodiments for automated service interface optimization. In one embodiment, a service client and/or a service provider is reconfigured to use an optimized version of a data transfer interface, where the optimized version transfers fewer data items from the service provider to the service client. In another embodiment, service calls from a service client for multiple different data objects are aggregated into an aggregated service call for a data object. In yet another embodiment, an optimized data object is provided to a service client in response to a request for an unoptimized data object. If the service client attempts to use a data item excluded from the optimized data object, the excluded data item is then provided to the service client.

20 Claims, 7 Drawing Sheets

(56) References Cited

U.S. PATENT DOCUMENTS

| | | |
|---|---|---|
| 2002/0184214 A1 | 12/2002 | Lucovsky et al. |
| 2005/0172281 A1 | 8/2005 | Goring et al. |
| 2006/0047679 A1 | 3/2006 | Purdy et al. |
| 2007/0217275 A1 | 9/2007 | Abe |
| 2008/0163253 A1 | 7/2008 | Massmann et al. |
| 2009/0083314 A1 | 3/2009 | Maim |
| 2009/0150417 A1 | 6/2009 | Ghods et al. |
| 2011/0055254 A1 | 3/2011 | Symons et al. |
| 2012/0072925 A1 | 3/2012 | Jenkins et al. |
| 2014/0379789 A1 | 12/2014 | Jenkins et al. |

AUTOMATED SERVICE INTERFACE OPTIMIZATION

CROSS-REFERENCE TO RELATED APPLICATIONS

This application is a continuation of, and claims priority to, U.S. Patent Application entitled "AUTOMATED SERVICE INTERFACE OPTIMIZATION," filed on Sep. 8, 2014, and assigned application Ser. No. 14/479,759, which issued May 19, 2015 as U.S. Pat. No. 9,038,094, which is a continuation of, and claims priority to, U.S. Patent Application entitled "AUTOMATED SERVICE INTERFACE OPTIMIZATION," filed on Aug. 5, 2013, and assigned application Ser. No. 13/959,340, which issued Sep. 9, 2014 as U.S. Pat. No. 8,832,714, which is a continuation of, and claims priority to, co-pending U.S. Patent Application entitled "AUTOMATED SERVICE INTERFACE OPTIMIZATION," filed on Dec. 17, 2009, and assigned application Ser. No. 12/640,321, which issued Aug. 6, 2013 as U.S. Pat. No. 8,505,034, all of which are incorporated herein by reference in their entirety.

BACKGROUND

In the context of a service-oriented architecture, a service provides software functionality in such a way that disparate systems are interoperable. The software functionality provided by a service often encompasses business logic. For each service, there will be at least one service provider and any number of service clients configured to communicate with the service provider(s).

The service provider is associated with an application programming interface (API), which defines how the service may be accessed, for example, through method or procedure calls. The service clients are configured to make service API calls, which are sent to the service provider. The service provider is configured to provide data to the service client in response to a service API call, often in the form of a data object. As service providers and service clients may be executing on different computer systems, such data objects may be serialized and then transmitted over an appropriate data communications network.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
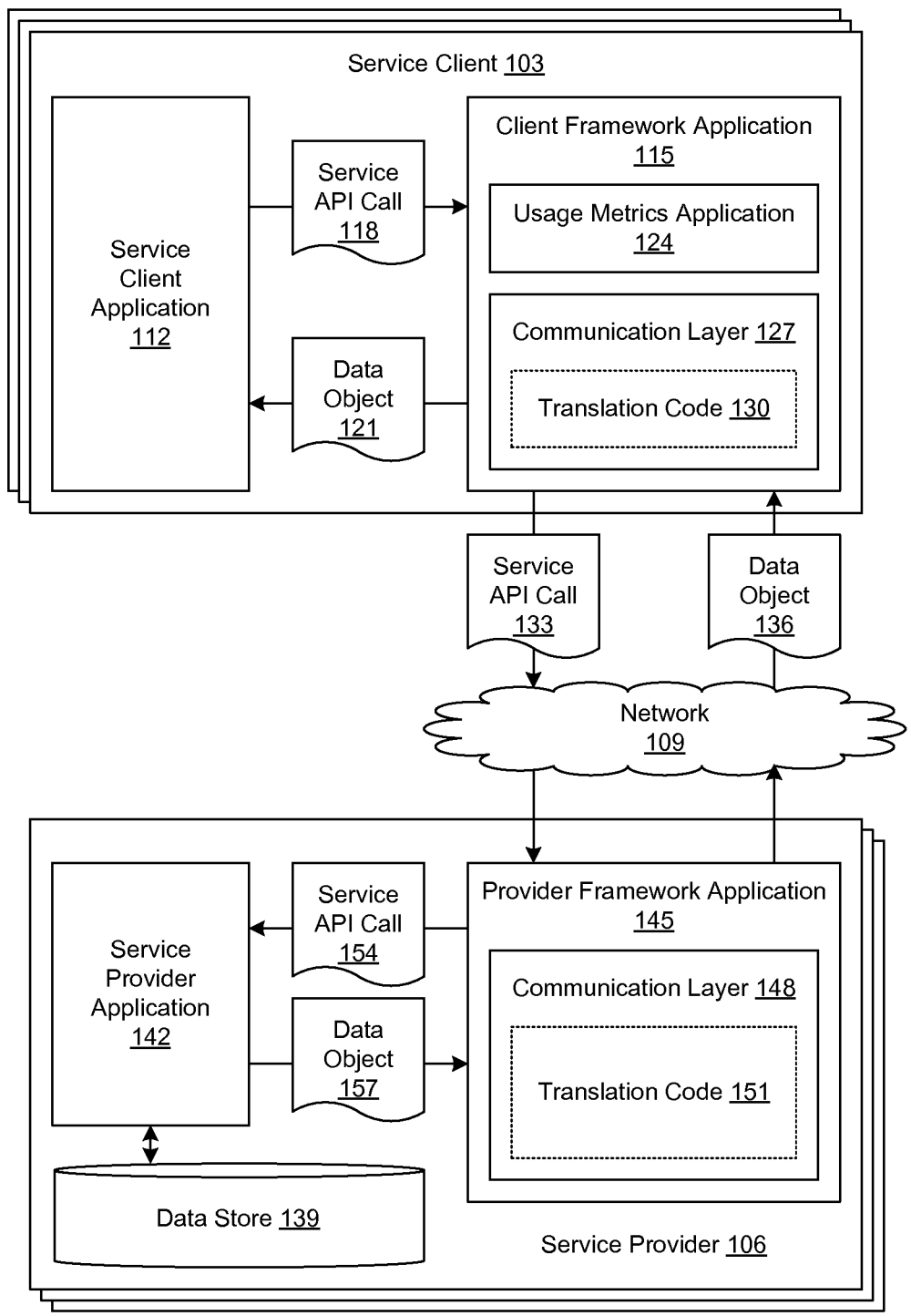
FIG. 1 is a drawing of a service environment according to various embodiments of the present disclosure.

In a service-oriented architecture, service providers and service clients may be implemented by different software development teams. In some cases, the service provider may be implemented well before a service client is conceived and developed. For these reasons, the developers of service providers may have an incomplete understanding of how the service, or the data provided by the service, will be used by the service clients. In order to simplify the software development process, the developers of a service provider may decide to support as few service API calls as possible. Consequently, the simplified API may be easier to maintain. As a non-limiting example, a service provider may support a single service API call that provides a data object containing all of the data that may be generated from the business logic embodied in the service provider.

However, such data objects may contain data that is unnecessary for a particular service client. For example, a service client may be implemented to generate a network page listing new items from an online catalog. Suppose that the service client obtains a list of item identifiers. The service client may then communicate with a service provider repeatedly to obtain the item titles associated with the respective items. Suppose that the service client makes a service API call ItemService.getItemByItemIdentifier(ItemIdentifier id) for each item identifier. Each of the getItemByItemIdentifier( )calls may result in an item data object, which may, for example, be megabytes or more in size and contain all kinds of information about the respective item, such as price, weight, images, description, and so on. Because the service client is configured to use the title of the item only, which may be just a short character string, all of the other data retrieved from the ItemService for each item is unnecessary.

Data objects provided by a service may be relatively large in data size, consuming considerable bandwidth in the aggregate to be transmitted over data communication networks to service clients. In addition, transmission of a data object across a data communications network may involve serialization and deserialization of the data object. Serialization is a data encoding process for data objects that is complex and may require considerable computing resources (e.g., in terms of processor time, memory space, etc.) in the aggregate to perform. Therefore, serialization of a data object that contains data that will not be used by a service client may waste system resources.

Various embodiments of the present disclosure provide automated service interface optimization to address this problem. The various embodiments take into account that a given service API may not be optimized for every service client, such as, for example, the service client using only the item title from an item object. To this end, the various embodiments include a client framework and a provider framework in order to connect the service clients with a service provider. Based at least in part on client usage metrics, the various embodiments are able to optimize the contents of a data object sent over a data communications network from a service provider to a service client. The optimized data objects realize benefits in reduced bandwidth consumption, reduced computing resource demand for serialization and deserialization operations, and other benefits. In the following discussion, a general description of the system and its components is provided, followed by a discussion of the operation of the same.

With reference to FIG. 1, shown is a service environment 100 according to various embodiments. The service environment 100 includes one or more service clients 103 that communicate with one or more service providers 106 by way of a network 109. It is understood that a service client 103 may be in communication with multiple service providers 106, while a service provider 106 may be in communication with multiple service clients 103. The network 109 includes, for example, the Internet, intranets, extranets, wide area networks (WANs), local area networks (LANs), wired networks, wireless networks, or other suitable networks, etc., or any combination of two or more such networks.

The service client 103 may comprise, for example, a server computer or any other computing device or system providing computing capability. The service client 103 may represent multiple computer systems arranged, for example, in one or more server banks or other arrangements. To this end, the service client 103 may comprise, for example, a cloud computing resource, a grid computing resource, and/or any other distributed computing arrangement. Such computer systems may be located in a single installation or may be dispersed among many different geographical locations. In one embodiment, the service client 103 represents a virtualized computer system executing on one or more physical computing systems. For purposes of convenience, the service client 103 is referred to herein in the singular. However, in one embodiment, the service client 103 represents a plurality of computer systems arranged as described above.

Various applications and/or other functionality may be executed in the service client 103 according to various embodiments. The components executed on the service client 103, for example, include a service client application 112, a client framework application 115, and other applications, services, processes, systems, engines, or functionality not discussed in detail herein. The service client application 112 is executed to provide functionality that uses at least one service. Thus, the service client application 112 is configured to make at least one service API call 118 to the client framework application 115 and to receive in response at least one data object 121 from the client framework application 115.

The client framework application 115 is executed to provide communication functionality between the service client application 112 and at least one service provider 106. The client framework application 115 may include a usage metrics application 124, a communication layer 127, and/or other subcomponents. The usage metrics application 124 is executed to determine various usage metrics associated with the service client application 112. Specifically, the usage metrics application 124 may determine which data fields and/or methods within the data object 121 are in fact used by the service client application 112. To this end, the usage metrics application 124 may be configured to examine at least a portion of code that implements the service client application 112 for usage of each of the data fields and/or methods.

The communication layer 127 facilitates communication between the client framework application 115 and at least one service provider 106 over the network 109. The communication layer 127 may include translation code 130 that may be configured to translate one service API call 118 to another service API call 133 and another data object 136 to the data object 121. In other words, translation code 130 may function as a client-side adapter for changes to the service API.

The service provider 106 may comprise, for example, a server computer or any other computing device or system providing computing capability. The service provider 106 may represent multiple computer systems arranged, for example, in one or more server banks or other arrangements. To this end, the service provider 106 may comprise, for example, a cloud computing resource, a grid computing resource, and/or any other distributed computing arrangement. Such computer systems may be located in a single installation or may be dispersed among many different geographical locations. In one embodiment, the service provider 106 represents a virtualized computer system executing on one or more physical computing systems. For purposes of convenience, the service provider 106 is referred to herein in the singular. However, in one embodiment, the service provider 106 represents a plurality of computer systems arranged as described above.

Various applications and/or other functionality may be executed in the service provider 106 according to various embodiments. Also, various data is stored in a data store 139 that is accessible to the service provider 106. The data store 139 may be representative of a plurality of data stores as can be appreciated. The data stored in the data store 139, for example, is associated with the operation of the various applications and/or functional entities described below.

The components executed on the service provider 106, for example, include a service provider application 142, a provider framework application 145, and other applications, services, processes, systems, engines, or functionality not discussed in detail herein. The service provider application 142 is executed to provide functionality related to a service. The service provider application 142 may include business logic used to implement the particular service and/or may act as an interface with other systems and/or applications. The service provider application 142 may access various data stored within the data store 139 in order to implement the particular service and generate data objects as needed.

The provider framework application 145 is executed to provide communication functionality between the service provider application 142 and service clients 103. To this end, the provider framework application 145 may include a communication layer 148, which may further include translation code 151. The translation code 151 may function as a server-side adapter for changes to the service API. The communication layer 148 may, for example, translate a service API call 133 received over the network 109 to a service API call 154 and may also translate a data object 157 produced by a service provider application 142 in response to the service API call 154 into a data object 136 suitable for transmission over the network 109. Thus, the data object 136 may be serialized or subjected to some other encoding to make it suitable for transmission over the network 109.

Next, a general description of the operation of the various components of the service environment 100 is provided. To begin, the service client application 112 makes a service API call 118, which is received by the client framework application 115. Although herein the service API call 118 is primarily referred to in the singular, it is understood that the service API call 118 may represent multiple service API calls 118 for different data objects 121 from a same service provider 106.

The communication layer 127 of the client framework application 115 processes the service API call 118 and may, in some embodiments, execute translation code 130 to translate the service API call 118 into the service API call 133. The service API call 133 is then transmitted over the network 109 to the provider framework application 145 executing on the service provider 106. The communication layer 148 of the provider framework application 145 receives the service API call 133 and, in some embodiments, may execute translation code 151 to process the service API call 133. Thus, in some embodiments, the service API call 133 is translated into a service API call 154, which is then submitted to the service provider application 142. Where the service API call 118 represents multiple service API calls 118, the translation to a service API call 133 or a service API call 154 may involve aggregation and/or combination into fewer service API calls 133 and/or fewer service API calls 154. Such aggregation may use, for example, a cache buffer to store the multiple service API calls 118.

The service provider application 142 receives the service API call 154 and performs some functionality in response to the service API call 154. The service provider application 142 may communicate with other applications and/or systems and may retrieve data from the data store 139. Ultimately, the service provider application 142 is configured to generate a data object 157 in response to the service API call 154. Where the service API call 118 represents multiple service API calls 118, the data object 157 may represent different data objects 157 corresponding to the respective service API calls 118.

The provider framework application 145 receives the generated data object 157 from the service provider application 142. The communication layer 148 then processes the data object 157 so that it may be transmitted over the network 109. To this end, the communication layer 148 may be configured to serialize, or otherwise encode, the data object 157 into a data object 136 for transmission over the network 109. The translation code 151 may be employed in various embodiments to translate the data object 157 into another format that may include fewer fields and/or methods, thereby producing an optimized data object 136. The optimized data object 136 may be associated with a smaller data size and a lower data encoding complexity than that of the unoptimized data object 157.

In one embodiment, the optimized data object 136 may correspond to an aggregation of data items from multiple different data objects 157. As a non-limiting example, the optimized data object 136 may include at least one data item from each respective set of data items of each of the multiple different data objects 157. The data items in the optimized data object 136 may be selected based at least in part on the usage metrics determined by the usage metrics application 124. Likewise, the optimized data object 136 may have a smaller data size and lower data encoding complexity than that of the multiple different data objects 157. The optimized data object 136 is then sent over the network 109 to the service client 103.

The communication layer 127 of the client framework application 115 receives the data object 136 from the service provider 106 over the network 109. The communication layer 127 may execute translation code 130 in various embodiments in order to translate the data object 136 into a data object 121. The communication layer 127 may perform deserialization of, or may otherwise decode, the data object 136 received over the network 109 to produce the data object 121. Thereafter, the client framework application 115 returns the data object 121 to the service client application 112. The service client application 112 may then use the data object 121 in order to perform some functionality.

The contents of the data object 157 (i.e., a set of data items) may be analyzed in conjunction with usage metrics determined by the usage metrics application 124 to determine a first subset of data items that are predicted to be accessed by the service client application 112 during a time period and a second subset of data items that are predicted to be unaccessed by the service client application 112 during the time period. The first subset of data items may be a proper subset of the set of data items. A proper subset is a subset that excludes at least one data item from the set. Ultimately, the service provider 106 may be configured to provide the optimized data object 136 to the service client 103. The optimized data object 136 includes the first subset of data items and excludes the second subset of data items. In embodiments where the optimized data object 136 represents an aggregation of data items from multiple different data objects 157, the optimized data object 136 may include all distinct data items from the multiple different data objects 157, the aggregation into a single optimized data object 136 representing an optimization over multiple data objects 157.

Figure 4:
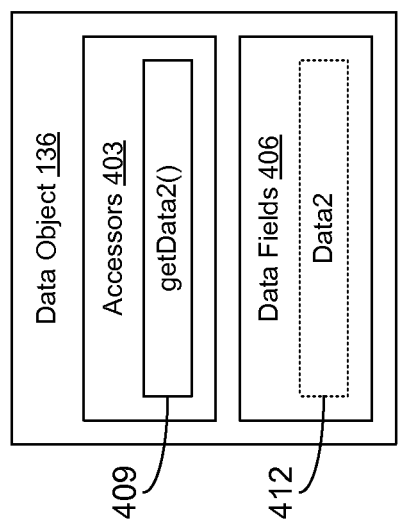
FIGS. 2-4 are diagrams showing data objects employed in the service environment of FIG. 1 according to various embodiments of the present disclosure.
Figure 3:
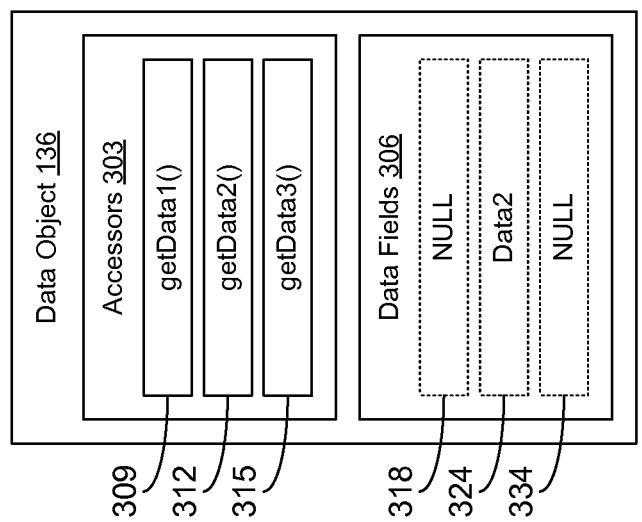
Figure 2:
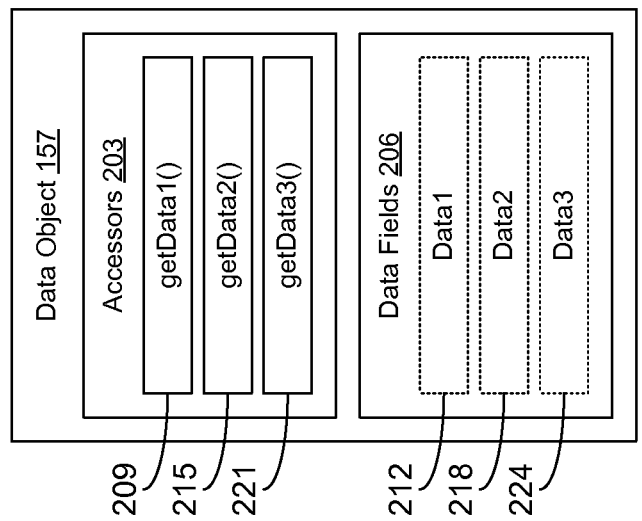

Referring next to FIGS. 2-4, shown are diagrams of examples of data objects employed in various embodiments of the service environment 100 (FIG. 1). FIG. 2 depicts a data object 157 that is unoptimized and ordinarily produced by the service provider application 142 (FIG. 1) executing on the service provider 106 (FIG. 1). The data object 157 includes a plurality of accessors 203 and a plurality of data fields 206. The accessors 203 are employed in order to retrieve the data fields 206 from the data object 157. Thus, when an accessor 209 (getData1( )) is called, the data field 212 (Data1) is returned. Similarly, when an accessor 215 (getData2( )) is called, a data field 218 (Data2) is returned. Further, when an accessor 221 (getData3( )) is called, a data field 224 (Data3) is returned. Although accessors 203 are customarily used in service-oriented architecture in order to obtain data fields 206, it is understood that in various embodiments the data fields 206 may be accessed directly without using a respective accessor 203.

FIG. 3 shows an optimized data object 136 that is provided to the service client application 112 (FIG. 1) executing on the service client 103 (FIG. 1). The data object 136 includes a plurality of accessors 303 and a plurality of data fields 306. The plurality of accessors 303 includes accessors 309, 312, 315, which correspond to the accessors 209, 215, 221 (FIG. 2) in the unoptimized data object 157 (FIG. 2). However, the data fields 306 may include empty values (shown, for example, as NULL) in the data fields 318, 321 in place of the data (Data1, Data3) contained in the data fields 212, 224 (FIG. 2) in the unoptimized data object 157. It is understood that the empty value corresponds to any placeholder indicating the absence of actual data in those data fields 306. Within the optimized data object 136, only the data field 324 contains data (Data2). As shown, the data object 136 may be optimized for a particular service client application 112 (FIG. 1). In other words, the particular service client application 112 does not use, or is not predicted to use, the data fields 212, 224 from the unoptimized data object 157.

In FIG. 4, another optimized data object 136 is depicted according to another embodiment. The optimized data object 136 includes accessors 403 and data fields 406. However, accessors 403 includes only one accessor 409 (getData2( )), and data fields 406 includes only one data field 412 (Data2). In contrast with the optimized data object 136 depicted in FIG. 3, the optimized data object 136 depicted in FIG. 4 omits accessors 309, 315 (FIG. 3) that will be unused, or are predicted to be unused, by the service client application 112. Further, the optimized data object 136 of FIG. 4 omits data fields 318, 321 (FIG. 3) also that are unused, or are predicted to be unused, by the service client application 112.

Consequently, the optimized data object 136 of FIG. 4 may have a smaller data size in serialized form than the optimized data object 136 depicted in FIG. 3. However, the optimized data object 136 of FIG. 4 may be of a different class or type than the optimized data object 136 shown in FIG. 3. When the service client application 112 is expecting a data object 136 of a first class, such as the class of the data object 157, some translation may be necessary by the translation code 130 (FIG. 1) on the service client 103 in order for the service client application 112 to use the optimized data object 136 depicted in FIG. 4.

Figure 5:
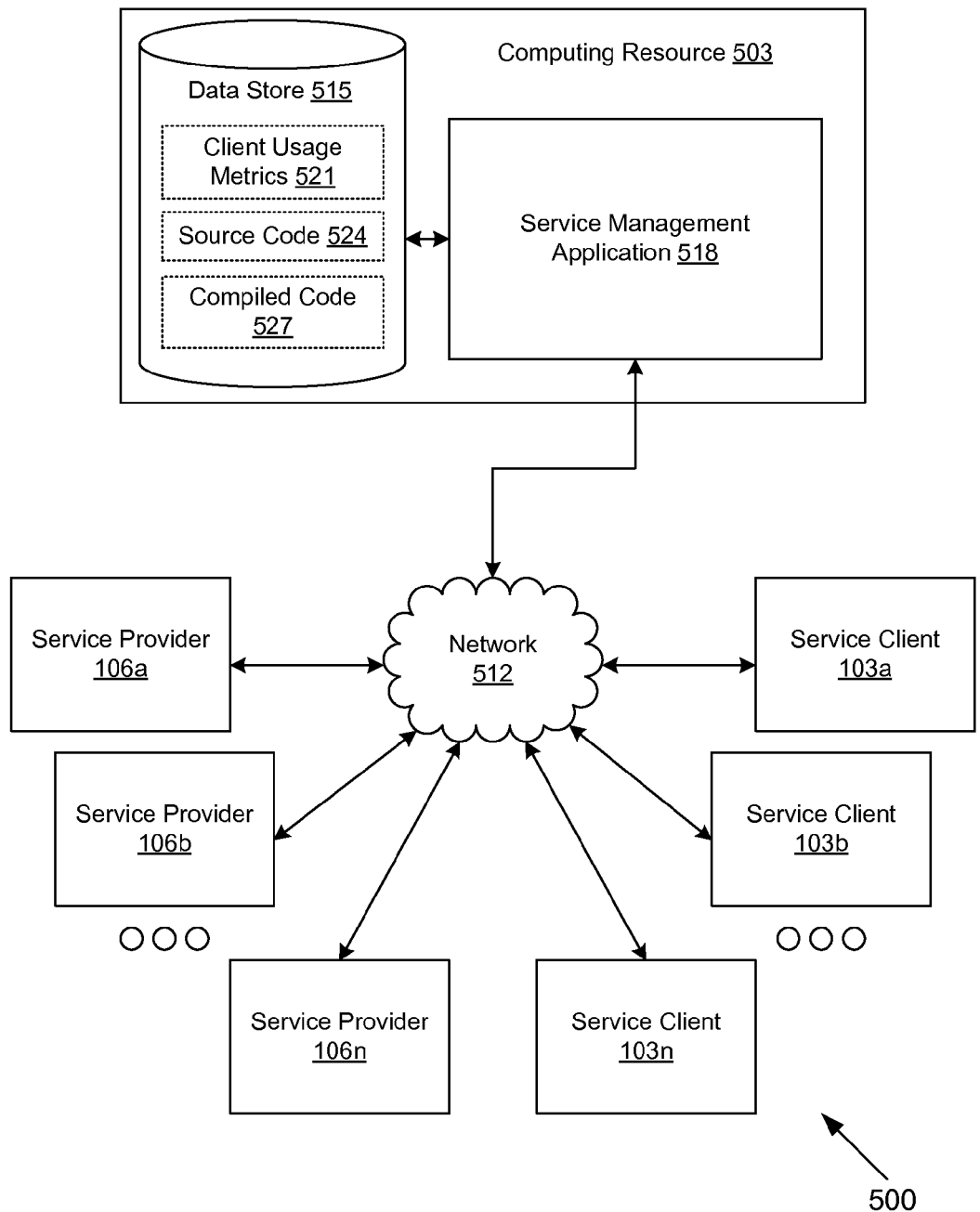
FIG. 5 is a drawing of a service management environment according to various embodiments of the present disclosure.

Turning now to FIG. 5, shown is a service management environment 500 according to various embodiments. The service management environment 500 includes a computing resource 503 in data communication with a plurality of service providers 106a, 106b, ... 106n, a plurality of service clients 103a, 103b, ... 103n, by way of a network 512. The network 512 includes, for example, the Internet, intranets, extranets, wide area networks (WANs), local area networks (LANs), wired networks, wireless networks, or other suitable networks, etc., or any combination of two or more such networks. The network 512 may correspond to the network 109 (FIG. 1) according to some embodiments.

The computing resource 503 may comprise, for example, a server computer or any other computing device or system providing computing capability. The computing resource 503 may represent multiple computer systems arranged, for example, in one or more server banks or other arrangements. To this end, the computing resource 503 may comprise, for example, a cloud computing resource, a grid computing resource, and/or any other distributed computing arrangement. Such computer systems may be located in a single installation or may be dispersed among many different geographical locations. In one embodiment, the computing resource 503 represents a virtualized computer system executing on one or more physical computing systems. For purposes of convenience, the computing resource 503 is referred to herein in the singular. However, in one embodiment, the computing resource 503 represents a plurality of computer systems arranged as described above.

Various applications and/or other functionality may be executed in the computing resource 503 according to various embodiments. Also, various data is stored in a data store 515 that is accessible to the computing resource 503. The data store 515 may be representative of a plurality of data stores as can be appreciated. The data stored in the data store 515, for example, is associated with the operation of the various applications and/or functional entities described below.

The components executed on the computing resource 503, for example, include a service management application 518 and other applications, services, processes, systems, engines, or functionality not discussed in detail herein. The service management application 518 is executed to optimize the service interfaces automatically between service providers 106 and service clients 103.

The data stored in the data store 515 includes, for example, client usage metrics 521, source code 524, compiled code 527, and/or potentially other data. The client usage metrics 521 represents data gathered from instances of the usage metrics application 124 (FIG. 1) executing on various service clients 103. The client usage metrics 521 represents usage metrics associated with various service client applications 112 (FIG. 1). Source code 524 represents code that may be employed within service client application 112, service provider application 142 (FIG. 1), client framework application 115 (FIG. 1), provider framework application 145 (FIG. 1), and/or other applications employed in the service environment 100 (FIG. 1). The compiled code 527 corresponds to a compiled version of the source code 524. In various embodiments, compiled code 527 may represent binary data, bytecode, intermediate code, and/or other code that is generated from the source code 524 by the service management application 518 or some other application.

Next, a general description of the operation of the various components of the service management environment 500 is provided. To begin, the service management application 518 determines a plurality of usage metrics for at least one service client 103 corresponding to a set of data items (e.g., data fields, accessors, etc.) within a data object 157 (FIG. 1) configured to be provided to the service client 103. Such a data object 157 may be unoptimized or previously optimized. The service management application 518 may obtain usage metrics from each respective service client 103 that have been determined by a usage metrics application 124 executing on each of the service clients 103.

The data object 157 is obtainable by the at least one service client 103 from a service provider 106 by way of a service API call 118 (FIG. 1). The service API call 118 may be the original API call selected by the developers in implementing the service client 103, or may correspond to a modified API call used in obtaining an optimized data object 157. The service management application 518 determines which accessors 203 and data fields 206 from the data object 157 are in fact used by the respective service client 103 or are predicted to be used by the service client 103. The service management application 518 stores the usage metrics in the client usage metrics 521.

In response to determining the client usage metrics 521, the service management application 518 configures the respective service provider 106 to provide an optimized data object 157 to the respective service client 103. The optimized data object 157 includes at least some of those data items from the set of data items that are predicted to be accessed by the respective service client 103 according to the usage metrics stored in the client usage metrics 521 and associated with the service client 103.

In one embodiment, the service management application 518 may configure the service client 103 to provide a filtering parameter to the service provider 106. As non-limiting examples, the filtering parameter may specify which data items within a data object 157 are to be included or which data items within the data object 157 are to be excluded. To implement use of a filtering parameter, the service management application 518 may, for example, modify the code of the service client application 112 in order to provide the filtering parameter in conjunction with the service API call 118 or the service management application 518 may modify the client framework application 115 to provide the filtering parameter in conjunction with the service API call 133 (FIG. 1).

Alternatively, the service provider 106 may be configured to identify the service client 103 that would be associated with a particular filtering parameter. As a non-limiting example, in such a case, the provider framework application 145 of the particular service provider 106 may supply the filtering parameter corresponding to the identified service client 103 to the service provider application 142 with the service API call 154 (FIG. 1).

The service management application 518 may configure the service provider application 142 to process the filtering parameter such that the produced data object 157 excludes the data fields 206 (FIG. 2) and/or accessors 203 (FIG. 2) that are not needed by the service client 103. Alternatively, the provider framework application 145 may process the data object 157 and the filtering parameter to produce an optimized data object 136 that excludes the accessors 303 (FIG. 3) and/or data items 306 (FIG. 3) that are not needed by the service client 103.

In another embodiment, the service client application 112 may be configured by the service management application 518 to make a different service API call 118 to request an optimized data object 121. Alternatively, the client framework application 115 may be configured to process an unmodified service API call 118 and to translate that into a different service API call 133, which is then sent over the network 109 to the service provider 106. In another variation, the provider framework application 145 may be configured to receive an original service API call 133 and translate that into a different service API call 154 which is then submitted to the service provider application 142. In yet another variation, the service provider application 142 itself may be reconfigured to support a different service API call 154 in order to produce an optimized data object 157.

Regardless of whether a filtering parameter or a different API call is used, the data object 136 sent over the network 109 is optimized and excludes data items that are not needed, or predicted to be needed, by the service client 103. Various embodiments are provided for translating the original data object 157 into an optimized data object 136. To this end, in a first embodiment, the service provider application 142 may provide an optimized data object 157 upon identification of the particular service client 103. Alternatively, the provider framework application 145 may act as an intermediary between the service provider application 142 and the service client 103 and translate an original data object 157 into an optimized data object 136 using, for example, translation code 151 (FIG. 1). The optimized data object 136 may correspond to the data object 136 depicted in FIG. 3 or the data object 136 shown in FIG. 4. Thus, the optimized data object 136 may be of a same class or of a different class than the original data object 157.

On the service client 103, the client framework application 115 may function to translate an optimized data object 136 into some other format. As a non-limiting example, the optimized data object 136 illustrated in FIG. 4 may be translated into the optimized data object 136 of FIG. 3 for compatibility with an unmodified service client application 112. Furthermore, the client framework application 115 may facilitate data access through the accessors 303 (FIG. 3). As a non-limiting example, when accessor 309 (FIG. 3) (getData1( ) is invoked by the service client application 112, instead of returning the empty value stored in data field 318 (FIG. 3), the client framework application 115 may then request the data field 212 (FIG. 2) (Data1) or the entire original data object 157 from the service provider 106. To this end, the client framework application 115 may make a service API call 133 corresponding to the original service API call 154 to produce the original data object 157, or the client framework application 115 may provide a filtering parameter to the service provider 106 indicating that the original data object 157 containing the data field 212 should be sent to the service client 103.

The optimization of the service interface may be performed in response to a manual indication received by the service management application 518, or the service management application 518 may be invoked on a regular basis according to a time period. For example, the source code 524 corresponding to a service client application 112 or a service provider application 142 may be recompiled into compiled code 527 on a regular basis. This provides an opportunity for the service management application 518 to refactor part of the source code 524 to implement the optimizations described above.

As a non-limiting example of refactoring, the service management application 518 may reconfigure an API specification from which source code 524 may be generated. In one embodiment, the source code 524 that is generated may include code "stubs," or incomplete sections of source code 524 where a software engineer is expected to complete the section manually with business logic code. In another embodiment, the source code 524 that is generated may already be completed with the business logic code. In various embodiments, the service management application 518 may modify the compiled code 527 directly and perform the API optimizations at compile time.

Alternatively, the service management application 518 may push the updated translation code 130 (FIG. 1), 151 to the service clients 103 and the service providers 106 when necessary. By optimizing the translation code 130, 151 instead of the service client application 112 or service provider application 142, the optimization process may happen more transparently. Further, the translation code 130 may be updated for a next version of the API for the service provider 106 so that the developers of the service client application 112 may continue to use a previous version of the API if desired.

Figure 6:
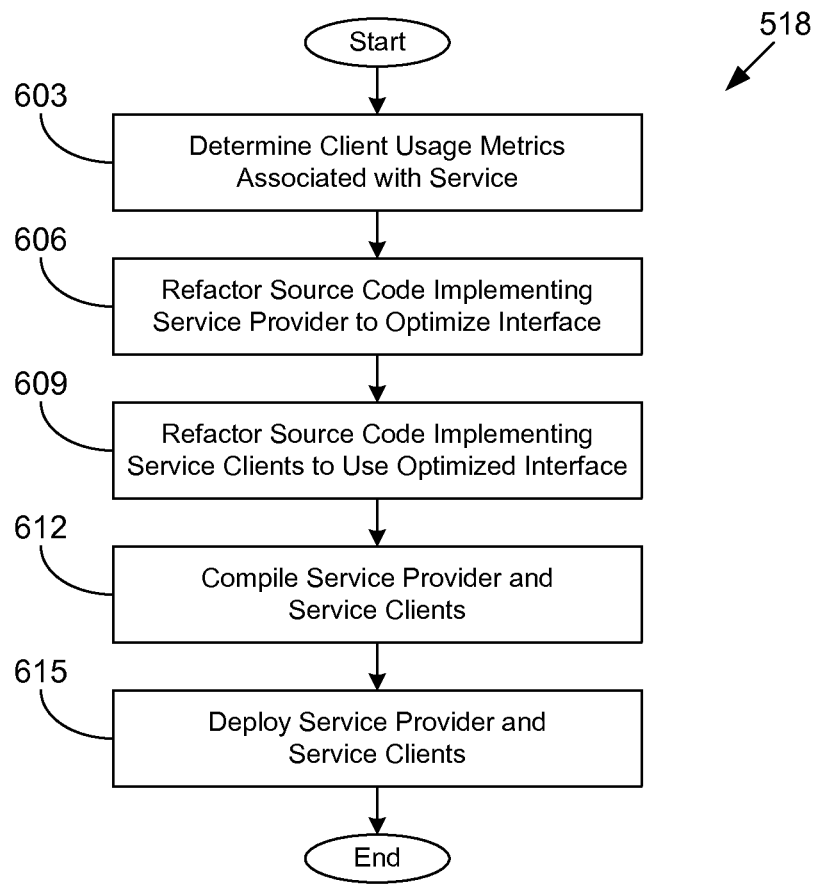
FIG. 6 is a flowchart illustrating one example of functionality implemented as portions of a service management application executed in a computing resource in the service management environment of FIG. 5 according to various embodiments of the present disclosure.

Referring next to FIG. 6, shown is a flowchart that provides one example of the operation of a portion of the service management application 518 according to various embodiments. It is understood that the flowchart of FIG. 6 provides merely an example of the many different types of functional arrangements that may be employed to implement the operation of the portion of the service management application 518 as described herein. As an alternative, the flowchart of FIG. 6 may be viewed as depicting an example of steps of a method implemented in the computing resource 503 (FIG. 5) according to one or more embodiments.

Beginning with box 603, the service management application 518 determines the client usage metrics 521 (FIG. 5) associated with a service. Next, in box 606, the service management application 518 refactors the source code 524 (FIG. 5) implementing one or more applications executing on a service provider 106 (FIG. 1) in order to optimize the interface between the service provider 106 and one or more service clients 103 (FIG. 1).

In box 609, the service management application 518 refactors the source code 524 that implements one or more applications executing on a service client 103 in order for the service client 103 to use the optimized interface. Alternatively, the service management application 518 may merely optimize the service provider 106 such that the service provider 106 can identify a particular service client 103 and then provide an optimized data object 136 (FIG. 1) based on the identification of the particular service client 103.

Thereafter, in box 612, the service management application 518 compiles the applications implementing service providers 106 and/or the service clients 103. Then, in box 615, the service management application 518 is configured to deploy the service providers 106 and the service clients 103. Thereafter, the service management application 518 ends.

Figure 7:
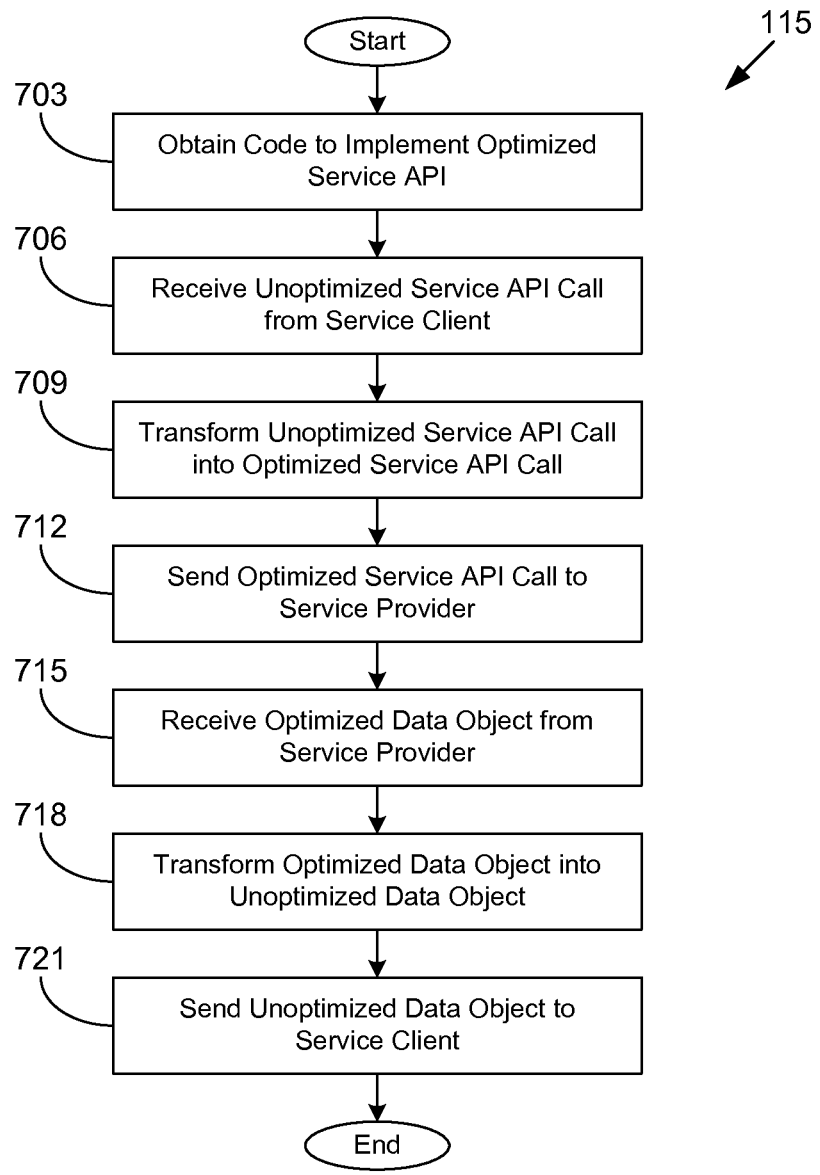
FIGS. 7 and 8 are flowcharts illustrating examples of functionality implemented as portions of a client framework application executed in a service client in the service environment of FIG. 1 according to various embodiments of the present disclosure.

Moving on to FIG. 7, shown is a flowchart that provides one example of the operation of a portion of the client framework application 115 according to various embodiments. It is understood that the flowchart of FIG. 7 provides merely an example of the many different types of functional arrangements that may be employed to implement the operation of the portion of the client framework application 115 as described herein. As an alternative, the flowchart of FIG. 7 may be viewed as depicting an example of steps of a method implemented in the service client 103 (FIG. 1) according to one or more embodiments.

Beginning with box 703, the client framework application 115 obtains code in order to implement an optimized service API from the service management application 518 (FIG. 5) or the service provider 106 (FIG. 1). This code may, in some embodiments, correspond to the translation code 130 (FIG. 1). In box 706, the client framework application 115 receives an unoptimized service API call 118 (FIG. 1) from a service client application 112 (FIG. 1). Next, in box 709, the client framework application 115 transforms the unoptimized service API call 118 into an optimized service API call 133 (FIG. 1). This transformation may include adding, or modifying, one or more filtering parameters to the optimized service API call 133 or translating the unoptimized service API call 118 into an entirely different service API call 133. The transformation may also involve combining multiple service API calls 118. Optimized service API call 133 may be serialized for transmission over a network 109 (FIG. 1) in various embodiments.

In box 712, the client framework application 115 then sends the optimized API call 133 to the service provider 106. In response, in box 715, the client framework application 115 receives an optimized data object 136 from the service provider 106. Next, in box 718, the client framework application 115 then transforms the optimized data object 136 (FIG. 1) into a data object 121 (FIG. 1) that is compatible with the unoptimized format. In box 721, the client framework application 115 then returns the unoptimized data object 121 (or multiple unoptimized data objects 121, where appropriate) to the service client application 112. Thereafter, the client framework application 115 ends.

Figure 8:
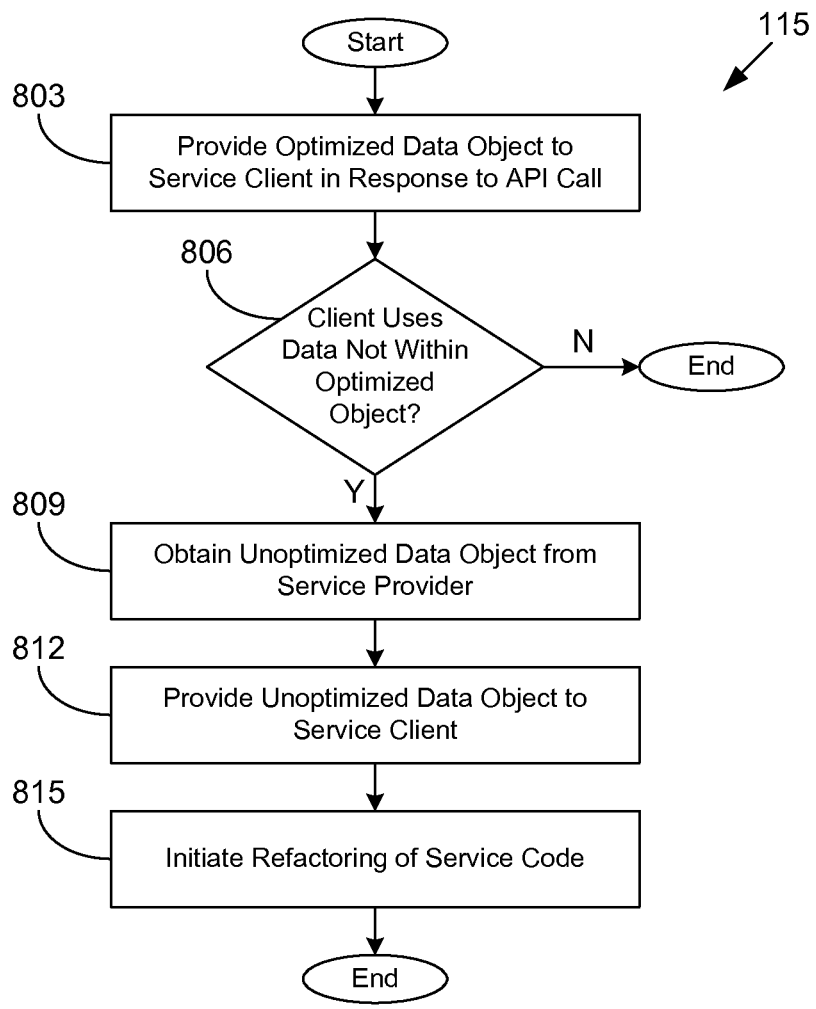

Turning now to FIG. 8 shown is a flowchart that provides an example of the operation of another portion of the client framework application 115 according to various embodiments. It is understood that the flowchart of FIG. 8 provides merely an example of the many different types of functional arrangements that may be employed to implement the operation of the portion of the client framework application 115 as described herein. As an alternative, the flowchart of FIG. 8 may be viewed as depicting an example of steps of a method implemented in the service client 103 (FIG. 1) according to one or more embodiments.

Beginning with box 803, the client framework application 115 provides an optimized data object 121 (FIG. 1) to a service client application 112 (FIG. 1) in response to a service API call 118 (FIG. 1). Then, in box 806, the client framework application 115 determines whether the service client application 112 uses data items that are not within the optimized data object 121. If, in box 806, the client framework application 115 determines that the service client application 112 does not use data that is not within the optimized data object 121, the client framework application 115 ends.

Otherwise, if the client framework application 115 determines in box 806 that the service client application 112 does use data items that are not within the optimized data object 121, then the client framework application 115 proceeds to box 809 and obtains an unoptimized data object 157 (FIG. 1) from the service provider 106 (FIG. 5). Next, in box 812, the client framework application 115 provides the unoptimized data object 157 to the service client application 112. In some embodiments, only the missing/requested data may be provided. Optionally, in box 815, the client framework application 115 may be configured to initiate refactoring of the source code 524 that is associated with the service client application 112 or the client framework application 115. Alternatively, the refactoring of the source code 524 may be initiated by the service management application 518 (FIG. 5) after examining client usage metrics 521 (FIG. 5). Thereafter, the client framework application 115 ends.

Figure 9:
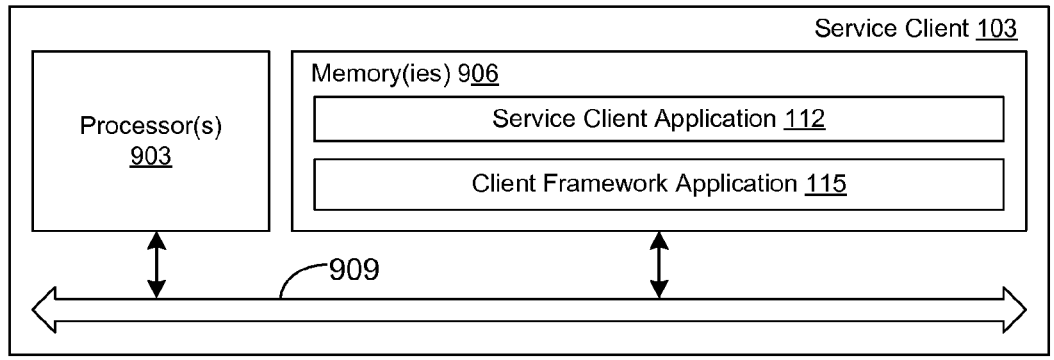
FIG. 9 is a schematic block diagram that provides an example illustration of a service client employed in the service environment of FIG. 1 according to various embodiments of the present disclosure.

With reference to FIG. 9, shown is a schematic block diagram of the service client 103 according to an embodiment of the present disclosure. The service client 103 includes at least one processor circuit, for example, having a processor 903 and a memory 906, both of which are coupled to a local interface 909. To this end, the service client 103 may comprise, for example, at least one computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are service client application 112, client framework application 115, and potentially other applications. In addition, an operating system may be stored in the memory 906 and executable by the processor 903.

Figure 10:
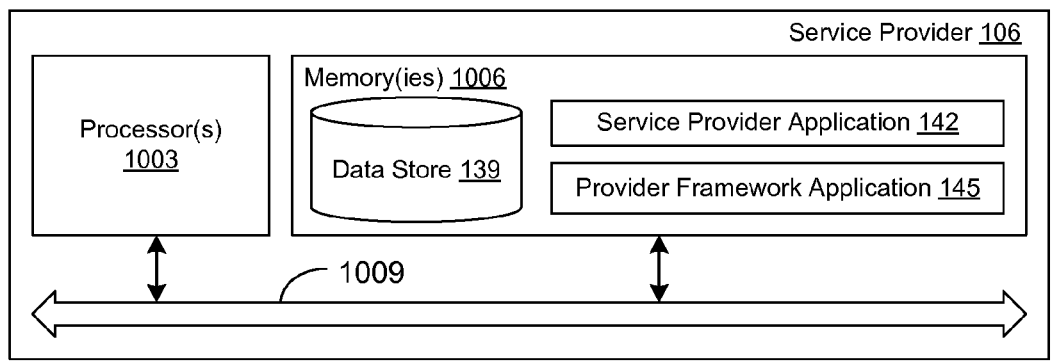
FIG. 10 is a schematic block diagram that provides an example illustration of a service provider employed in the service environment of FIG. 1 according to various embodiments of the present disclosure.

Moving now to FIG. 10, shown is a schematic block diagram of the service provider 106 according to an embodiment of the present disclosure. The service provider 106 includes at least one processor circuit, for example, having a processor 1003 and a memory 1006, both of which are coupled to a local interface 1009. To this end, the service provider 106 may comprise, for example, at least one computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the service provider application 142, the provider framework application 145, and potentially other applications. Also stored in the memory 1006 may be a data store 139 and other data. In addition, an operating system may be stored in the memory 1006 and executable by the processor 1003.

Figure 11:
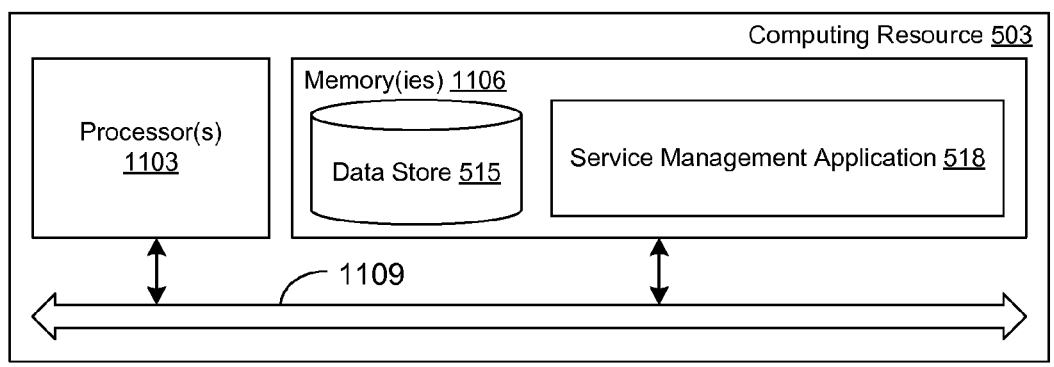
FIG. 11 is a schematic block diagram that provides an example illustration of a computing resource employed in the service management environment of FIG. 5 according to various embodiments of the present disclosure.

Referring next to FIG. 11, shown is a schematic block diagram of the computing resource 503 according to an embodiment of the present disclosure. The computing resource 503 includes at least one processor circuit, for example, having a processor 1103 and a memory 1106, both of which are coupled to a local interface 1109. To this end, the computing resource 503 may comprise, for example, at least one computer or like device. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are the service management application 518 and potentially other applications. Also stored in the memory 1106 may be a data store 515 and other data. In addition, an operating system may be stored in the memory 1106 and executable by the processor 1103.

Referring back to FIGS. 9-11, it is understood that there may be other applications that are stored in the memory 906, 1006, 1106 and are executable by the processors 903, 1003, 1103 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 906, 1006, 1106 and are executable by the processor 903, 1003, 1103. In this respect, the term "executable" means a program file that is in a form that can ultimately be run by the processor 903, 1003, 1103. Examples of executable programs may be, for example, a compiled program that can be translated into machine code in a format that can be loaded into a random access portion of the memory 906, 1006, 1106 and run by the processor 903, 1003, 1103, source code that may be expressed in proper format such as object code that is capable of being loaded into a random access portion of the memory 906, 1006, 1106 and executed by the processor 903, 1003, 1103, or source code that may be interpreted by another executable program to generate instructions in a random access portion of the memory 906, 1006, 1106 to be executed by the processor 903, 1003, 1103, etc. An executable program may be stored in any portion or component of the memory 906, 1006, 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906, 1006, 1106 is defined herein as including both volatile and nonvolatile memory and data storage components. Volatile components are those that do not retain data values upon loss of power. Nonvolatile components are those that retain data upon a loss of power. Thus, the memory 906, 1006, 1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903, 1003, 1103 may represent multiple processors 903, 1003, 1103 and the memory 906, 1006, 1106 may represent multiple memories 906, 1006, 1106 that operate in parallel processing circuits, respectively. In such a case, the local interface 909, 1009, 1109 may be an appropriate network 109 (FIG. 1) or network 512 (FIG. 5) that facilitates communication between any two of the multiple processors 903, 1003, 1103, between any processor 903, 1003, 1103 and any of the memories 906, 1006, 1106, or between any two of the memories 906, 1006, 1106, etc. The local interface 909, 1009, 1109 may comprise additional systems designed to coordinate this communication, including, for example, performing load balancing. The processor 903, 1003, 1103 may be of electrical or of some other available construction.

Although the service client application 112, the client framework application 115, the service provider application 142, the provider framework application 145, the service management application 518, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6-8 show the functionality and operation of an implementation of portions of the service management application 518 and the client framework application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903, 1003, 1103 in a computer system or other system. The machine code may be converted from the source code, etc. If embodied in hardware, each block may represent a circuit or a number of interconnected circuits to implement the specified logical function(s).

Although the flowcharts of FIGS. 6-8 show a specific order of execution, it is understood that the order of execution may differ from that which is depicted. For example, the order of execution of two or more blocks may be scrambled relative to the order shown. Also, two or more blocks shown in succession in FIGS. 6-8 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service client application 112, the client framework application 115, the service provider application 142, the provider framework application 145, and the service management application 518, that comprises software or code can be embodied in any computer-readable medium for use by or in connection with an instruction execution system such as, for example, a processor 903, 1003, 1103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   a service client executable in the at least one computing device, wherein when executed the service client causes the at least one computing device to at least:
   receive a set of data items from a service provider via a data transfer interface;
   determine which of the set of data items are used by the service client;
   generate usage metrics indicating that a proper subset of the set of data items are used by the service client; and
   report the usage metrics to the service provider.

2. The system of claim 1, wherein the service provider is configured to optimize the data transfer interface to exclude at least one data item from the set of data items based at least in part on the usage metrics.

3. The system of claim 1, wherein the data transfer interface requires that the set of data items be requested all together.

4. The system of claim 1, wherein the set of data items are received by the service client within a data object.

5. The system of claim 1, wherein the set of data items is received in response to a service call generated by the service client to the service provider.

6. The system of claim 1, wherein the set of data items is received a plurality of times in response to a plurality of service calls generated by the service client to the service provider, and the usage metrics pertain to the plurality of service calls.

7. The system of claim 1, wherein when executed the service client further causes the at least one computing device to at least:
   determine which of the set of data items are not used by the service client; and
   wherein the usage metrics indicate that another proper subset of the set of data items are not used by the service client.

8. A method, comprising:
   determining, via at least one of one or more computing devices, a plurality of usage metrics for a service client corresponding to a set of data items, the set of data items being obtainable by the service client from a service provider via a data transfer interface;
   determining, via at least one of the one or more computing devices, a proper subset of the set of data items based at least in part on the plurality of usage metrics; and
   refactoring, via at least one of the one or more computing devices, source code to use an optimized version of the data transfer interface, the optimized version of the data transfer interface facilitating transfer of the proper subset of the set of data items from the service provider to the service client.

9. The method of claim 8, wherein refactoring the source code further comprises generating, via at least one of the one or more computing devices, at least one source code stub for manual completion.

10. The method of claim 8, wherein refactoring the source code further comprises reconfiguring, via at least one of the one or more computing devices, an application programming interface (API) specification.

11. The method of claim 8, wherein refactoring the source code further comprises refactoring, via at least one of the one or more computing devices, the source code of the service client to use the optimized version of the data transfer interface.

12. The method of claim 8, wherein refactoring the source code further comprises refactoring, via at least one of the one or more computing devices, the source code of the service provider to use the optimized version of the data transfer interface.

13. The method of claim 8, wherein the optimized version of the data transfer interface utilizes an optimized data object that includes the proper subset of the set of data items and excludes at least one of the set of data items.

14. The method of claim 13, wherein the optimized data object that includes an empty value in place of the at least one of the set of data items.

15. A non-transitory computer-readable medium embodying a program executable in at least one computing device, wherein when executed the program causes the at least one computing device to at least:
   provide an optimized data object to a service client in response to a request for an unoptimized data object;
   receive a request from the service client for a particular data item from the unoptimized data object that had been excluded from the optimized data object; and
   provide the particular data item to the service client in response to the request for the particular data item.

16. The non-transitory computer-readable medium of claim 15, wherein the request for the unoptimized data object corresponds to a service application programming interface (API) call.

17. The non-transitory computer-readable medium of claim 15, wherein when executed the program further causes the at least one computing device to at least generate the optimized data object based at least in part on a plurality of data object usage metrics associated with the service client.

18. The non-transitory computer-readable medium of claim 15, wherein when executed the program further causes the at least one computing device to at least:
   receive a subsequent request for the unoptimized data object from the service client; and
   provide another optimized data object to the service client in response to the subsequent request, wherein the other optimized data object includes the particular data item based at least in part on the request from the service client for the particular data item.

19. The non-transitory computer-readable medium of claim 15, wherein the request for the unoptimized data object includes a filtering parameter that indicates at least one data item of the unoptimized data object that is to be excluded from the optimized data object.

20. The non-transitory computer-readable medium of claim 15, wherein the request for the unoptimized data object includes a filtering parameter that indicates at least one data item of the unoptimized data object that is to be included in the optimized data object.

* * * * *